United States Patent
Engel

(10) Patent No.: US 6,843,612 B2
(45) Date of Patent: Jan. 18, 2005

(54) RETAINING RING APPARATUS AND METHOD

(75) Inventor: David Engel, Springwater, NY (US)

(73) Assignee: SPX Corporation, Charlotte, NC (US)

(*) Notice: Subject to any disclaimer, the term of this patent is extended or adjusted under 35 U.S.C. 154(b) by 0 days.

(21) Appl. No.: 10/084,143

(22) Filed: Feb. 28, 2002

(65) Prior Publication Data

US 2003/0059251 A1 Mar. 27, 2003

Related U.S. Application Data

(60) Provisional application No. 60/324,526, filed on Sep. 26, 2001.

(51) Int. Cl.[7] .................................. F16B 21/00
(52) U.S. Cl. ............... 403/19; 403/DIG. 7; 411/511
(58) Field of Search ................ 403/274, 289, 403/410, DIG. 7, 11, 19, 332, 326, 379.6; 411/516–519, 511, 521, 530, 352, 353, 361

(56) References Cited

U.S. PATENT DOCUMENTS

| 1,698,087 | A | * | 1/1929 | Field ........................... 55/377 |
| 2,402,693 | A | * | 6/1946 | Summerbell ................ 411/340 |
| 2,950,132 | A |   | 8/1960 | Kocsuta ....................... 285/307 |
| 4,151,779 | A | * | 5/1979 | Timmer ....................... 411/360 |
| 4,242,775 | A | * | 1/1981 | Eickmann .................... 24/16 R |
| 4,710,080 | A | * | 12/1987 | Sheppard ..................... 411/82.1 |
| 4,818,166 | A | * | 4/1989 | Szukay et al. ............... 411/361 |
| 5,054,952 | A |   | 10/1991 | Chara .......................... 403/326 |
| 5,429,396 | A |   | 7/1995 | Guest .......................... 285/205 |

* cited by examiner

Primary Examiner—Kenn Thompson
(74) Attorney, Agent, or Firm—Baker & Hostetler LLP

(57) ABSTRACT

A twist ring for placement in an annular groove having a generally C-shaped region with two ends. The twist ring has a first leg extending from one end and a second leg extending from the second end. The twist ring additionally has at least one finger projecting inwardly from the C-shaped region.

15 Claims, 3 Drawing Sheets

RETAINING RING APPARATUS AND METHOD

PRIORITY

This application claims priority to the Provisional U.S. Patent Application entitled, TWIST RING, filed Sep. 26, 2001, having a Ser. No. 60/324,526, the disclosure of which is hereby incorporated by reference.

FIELD OF THE INVENTION

The present invention relates generally to a method and apparatus for a retaining ring. More particularly, the present invention relates to a method and apparatus using a twist-type retaining ring manufactured from soft, ductile material.

BACKGROUND OF THE INVENTION

Retaining rings are generally provided to fit in a groove in the inner surface of a sleeve or outer component to prevent axial movement of an inner component located within the outer component or sleeve. The retaining rings are usually mounted within a radially inwardly open annular groove or channel located on the inner surface of the outer component. The inner components are inserted in the outer component and the retaining ring is then inserted into the annular groove of the outer component to secure the two components.

Generally, retaining rings such as the examples described above are commonly formed through work hardening processes from materials such as stainless steel. Due to the work hardening process, the stainless steel becomes very hard and resilient. In addition, the work hardening process is often limited to forming only those configurations that have uniform cross-sections. This is due to the fact that the production of non-uniform, work hardened portions would involve the implementation of a multi-step process, for example, employing a series of progressive manufacturing dies, which can significantly increase the price of production. Therefore, because the production of rings having non-uniform cross sections is cost restrictive, the available retaining ring geometries are usually very limited.

Accordingly, it would be desirable to provide a retaining ring for use in various rotating devices that is capable of being formed in various geometrical shapes in a cost efficient way. More particularly, it would be desirable to provide a twist ring formed from soft, ductile material that enables the ring to be configured in various geometries, including geometrical shapes having non-uniform cross-sections.

SUMMARY OF THE INVENTION

The foregoing needs are met, to a great extent, by the present invention where, in one aspect, a retaining ring is provided that is substantially yieldable and has a generally C-shaped region that includes an inner peripheral surface and an outer peripheral surface extending between a first end and a second end of the ring. Legs may extend towards each other from the respective ends.

In accordance with another aspect of the present invention, a method is provided for retaining an inner component within an outer component or sleeve using a retaining ring, having the steps of: twisting the retaining ring in first direction using a tool to, reduce the diameter of the ring; disposing the ring within a portion of the outer component; and twisting the retaining ring in a second, opposite direction using the tool to, increase the diameter of the ring.

In accordance with yet another aspect of the present invention, an additional method is provided for retaining an inner component within an outer component, using a retaining ring, having the steps of: inserting a tool into tool-receiving portions of legs of the retaining ring; rotating the tool in a first direction to displace the legs toward each other; inserting the retaining ring into an annular groove; rotating the tool in a second, opposite direction to displace the legs away from each other; and removing the tool from the tool receiving portions of legs.

There has thus been outlined, rather broadly, the more important features of the invention in order that the detailed description thereof that follows may be better understood, and in order that the present contribution to the art may be better appreciated. There are, of course, additional features of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION OF PREFERRED EMBODIMENTS OF THE INVENTION

Figure 1:
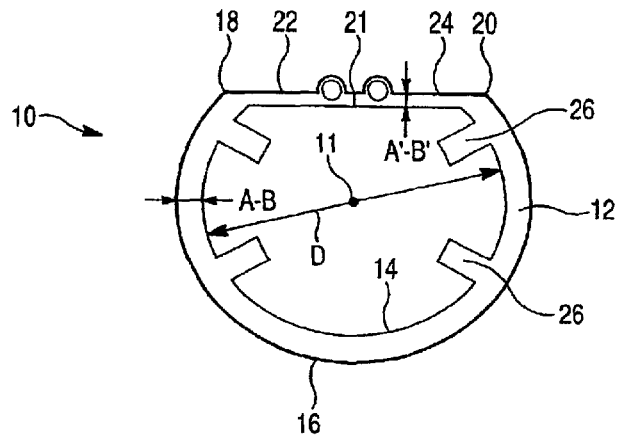
FIG. 1 is a top view of a twist ring in accordance with the present invention.

Referring now to the figures wherein like reference numerals indicate like elements, FIGS. 1–6 illustrate the presently preferred embodiments of a twist ring and method for its use. While in the embodiment depicted the twist ring is utilized in conjunction with an impeller assembly, it should be understood that the present invention is not limited in its application to impeller assemblies, and can be used in combination with various devices where assembled parts need to be retained, such as for example bearings, shafts, and other items.

Referring to FIG. 1, a top view of a twist ring 10 for placement in an annular groove of an impeller housing according to the present invention is shown in an uncompressed state. The twist ring 10 comprises a generally C-shaped region 12 that has an inner peripheral surface 14 and an outer peripheral surface 16. The C-shaped region 12 additionally includes a first end 18 and a second end 20. The first end 18 has a first leg 22 extending therefrom while the second end 20 has a second leg 24 extending therefrom. FIG. 1 further illustrates the twist ring 10 having a plurality of fingers 26 radially projecting inwardly in the C-shaped region 12.

More particularly, as shown in FIG. 1, the C-shaped region 12 is preferably circular in shape, having a fixed diameter D wherein any point located on the C-shaped region 12 is equidistant from a center point 11. Alternatively, the ring 10 may be employed in devices having non-circular geometries, for example, oval and/or polygonal geometries. In these applications, the C-shaped region, or its equivalent, may be shaped such that points lying along this region can vary in distance from a common center such as point 11. In the aforementioned embodiments where the C-shaped region 12 is non-circular, the diameter may be defined by the greatest distance across the C-shaped region.

Preferably, the C-shaped region 12 encompasses approximately a 270 degree arc from the first end 18 to the second end 20. In addition, the inner peripheral surface 14 and the outer peripheral surface 16 are at a constant radial distance from one another as the region 12 extends from the first end 18 to the second end 20, except in the locations along the inner peripheral surface 14 where the finger portions 26 are present. In these specific locations, the distance between the peripheral surfaces 14, 16, is greater than the referenced width A-B due to the finger portions 26. Therefore the width, referenced A-B, of the C-shaped region 12 remains constant as the region 12 extends from the first end 18 to the second end 20 except as to the specific locations on the C-shaped region where the finger portions 26 extend therefrom.

Figure 4:
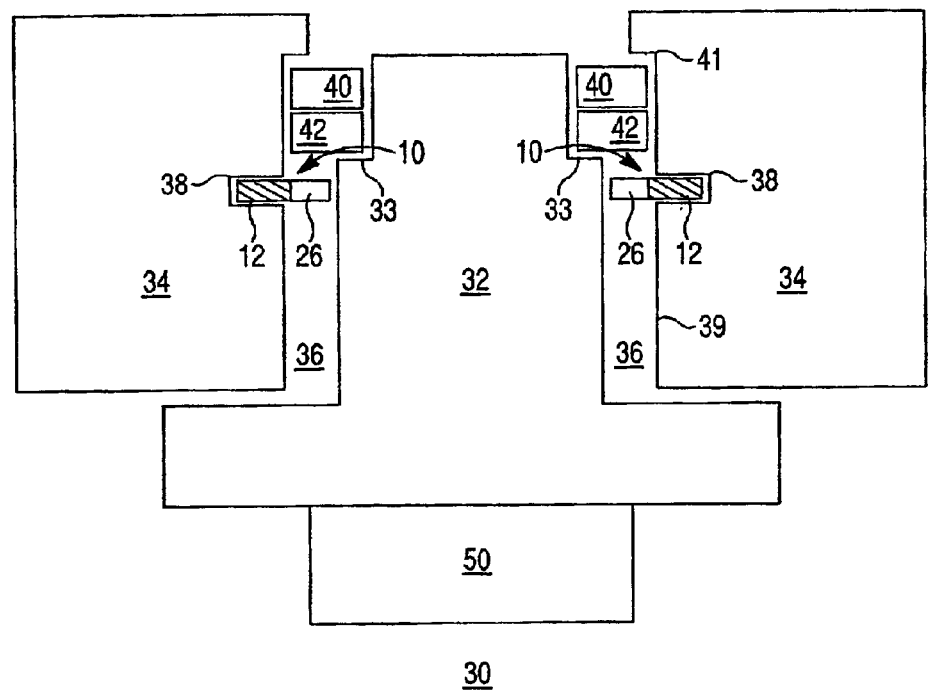
FIG. 4 is partial cross-sectional view of an impeller assembly using a twist ring in accordance with the present invention.

The aforementioned distance between the peripheral surfaces 14, 16 is preferably a distance such that when the retaining ring 10 is inserted into an annular groove of an impeller housing, for example, the width A-B does not extend across the entire clearance between the impeller housing and the stationary shaft. FIG. 4 illustrates a cross-sectional view of an impeller assembly 30 having a stationary shaft 32, a rotating impeller housing 34, a clearance 36 extending between the housing 34 and shaft 32, an annular groove 38, and two mixer bearings 40, 42. As depicted, the retaining ring 10 is inserted into the annular groove 38 of the impeller housing 34 and its width is such that the C-shaped portion does not extend across the entire clearance 36 and contact the stationary shaft 32. This spatial arrangement offers the impeller assembly 30 lubrication and cleaning capabilities. During operation, the contents being mixed in the vessel 44 are able to freely flow through the impeller assembly 30, providing lubrication to the bearings 40, 42, and reducing the likelihood of particle and/or biological build up within the impeller assembly 30. The twist ring 10 of the present invention is not limited to retaining only two bearing sets and may be employed in devices where one or a plurality of bearing sets are utilized.

Returning to FIG. 1, the legs 22 and 24 extend generally toward each other, at an angle away from each respective end 18 and 20, and preferably abut one another when in the installed uncompressed position. The legs 22 and 24 afford the twist ring 10 a discontinuity or separation 21 in the periphery of the twist ring 10. This discontinuity 21 assists in the insertion of the twist ring 10 into the annular groove of an impeller assembly. The legs 22 and 24 each include an end portion 28, wherein a tool may be received. Preferably, the end portion 28 is shaped as a slot, hole, and/or dimple. This configuration allows for the insertion of a tool, such as conventional snap-ring pliers, for operation of the twist ring 10; however the end portions 28 may be custom-designed to enable activation by alternative tools. The legs 22 and 24 preferably have a width A'-B' less than the width A-B of the C-shaped region 12. However, in alternate embodiments the width of the legs 22, 24 may be equal or similar to the width of the C-shaped region 12. In addition, alternative embodiments may not employ legs. Such examples may include a ring wherein the tool receiving portions are directly affixed to the C-shaped region. In these embodiments, the C-shaped region may encompass an arc greater than 270 degrees.

As previously indicated, the legs 22, 24 preferably extend generally toward each other at an angle to (i.e., not tangential to) each respective end 18, 20, and the legs 22, 24 abut one another (in the uncompressed state). This configuration inhibits the twist ring 10 from unintentionally compressing after installation and assists the ring 10 to maintain in its original shape and diameter during mixer operation.

Figure 2:
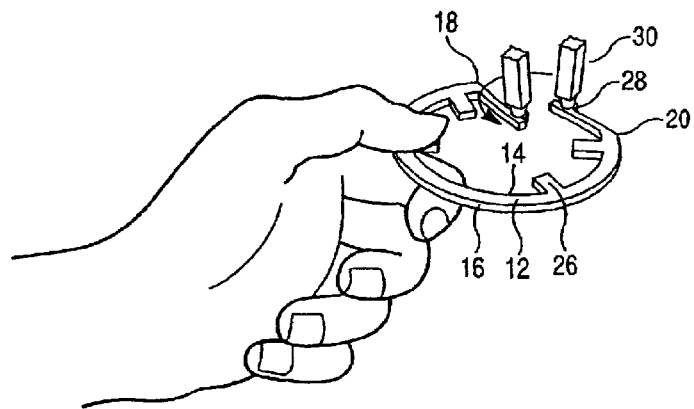
FIG. 2 is a perspective view of a twist ring in accordance with the present invention during installation in a compressed state.
Figure 3:
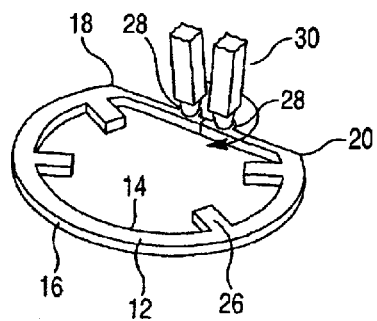
FIG. 3 is a perspective view of a twist ring in accordance with the present invention during installation in a uncompressed state.

As illustrated in FIGS. 1–3, the twist ring 10 of the present invention has four finger portions 26 projecting on the inner peripheral surface 14 of the C-shaped region 12. The finger portions 14 are preferably integral with the inner, peripheral surface and circumferentially spaced about the C-shaped region 12. As illustrated in FIG. 4, the finger portions 26 function to retain the bearings 40, 42 disposed within the impeller housing 34 by extending across substantially the entire clearance between the stationary shaft 32 and the impeller housing 34, preventing axial movement of the bearings 40, 42 during impeller assembly and disassembly. Although four finger portions 24 are preferred, the twist ring 10 may have additional finger portions or less finger portions, depending upon the application.

The twist ring 10 may be formed by various processes known in the art such as stamping and/or molding. In a preferred method, the twist ring 10 is layered from soft, ductile materials such as aluminum, plastic, carbon fiber and/or stainless steel. The use of a laser to cut the twist ring from the aforementioned materials provides a cost effective way for producing twist rings with varying geometries.

The twist ring 10 of the present invention is produced from a body of metal that is ductile, soft and has little or no shape memory, preferably non-work hardened 316 stainless steel. A benefit of the ductile properties of the non-work hardened stainless steel is that it allows the twist ring 10 to exhibit pliable characteristics affording the twist ring 10 to have little or no shape memory. These pliable characteristics enable the various components of the twist ring to be yielded into desired positions easily. In addition, the use of a ductile material such as non-work hardened stainless steel allows for the manufacture of the twist rings at significantly reduced cost. Further, the above described ductile properties combined with the orientation of the legs 22, 24 opposing one another assist both to facilitate installation of the ring and prevent the ring from deforming during impeller operation.

The ductile properties of the non-work hardened stainless steel enable both legs 22 and 24 to be yielded to a point where the twist ring may be compressed and inserted easily into the impeller housing 34 without exhibiting springback. The aforementioned yielding causes the C-shaped region 12 of the twist ring 10 to compress, reducing the diameter D of the C-shaped region 12. Because the twist ring is constructed from a ductile material, the ring 10 remains compressed without the assertion of constant pressure, and returns to its original shape upon the exertion of an opposite yielding force. Therefore, the twist ring can be easily inserted in the annular groove of the impeller housing 34.

Referring now to FIGS. 2 and 3, during the initial installation of the twist ring 10, the ring 10 is held stationary while a tool 30, preferably snap-ring pliers, is inserted into the tool receiving portions 28 of the legs 22 and 24. As illustrated in FIG. 2, the tool 30 is rotated, in a counterclockwise direction for example, angling and displacing the legs 22 and 24 in a direction generally towards each other. The snap-ring pliers may be rotated in either direction, clockwise or counterclockwise, to displace the legs 22 and 24. In this compressed state, the diameter is reduced. The legs 22, 24 and the ring 10 remain in this position, due to the ductile properties of the ring as previously described, until the tool is rotated in an opposite direction, generally subsequent to placement of the ring.

The twist ring 10 in the compressed state is aligned with the annular groove 38 in the impeller housing 34. After the twist ring 10 is aligned, it is next expanded to its original uncompressed shape and diameter, returning the legs 22, 24 to their original, opposing orientation as depicted in FIG. 3. In this position, the leg ends abut one another, preventing the likelihood of the ring compressing unintentionally. As shown in FIG. 3, the twist ring is returned to its original shape by a process similar to the contraction and insertion process previously described. The twist ring 10 is expanded to its original shape by rotating the snap-ring pliers 30 in the opposite direction of the installation procedure rotation, in this instance, clockwise. The snap-ring pliers are rotated until the legs 22 and 24 are aligned with one another, and the ring is returned to its original shape as illustrated in FIG. 3. The impeller assembly is now prepared for further installation.

Figure 5:
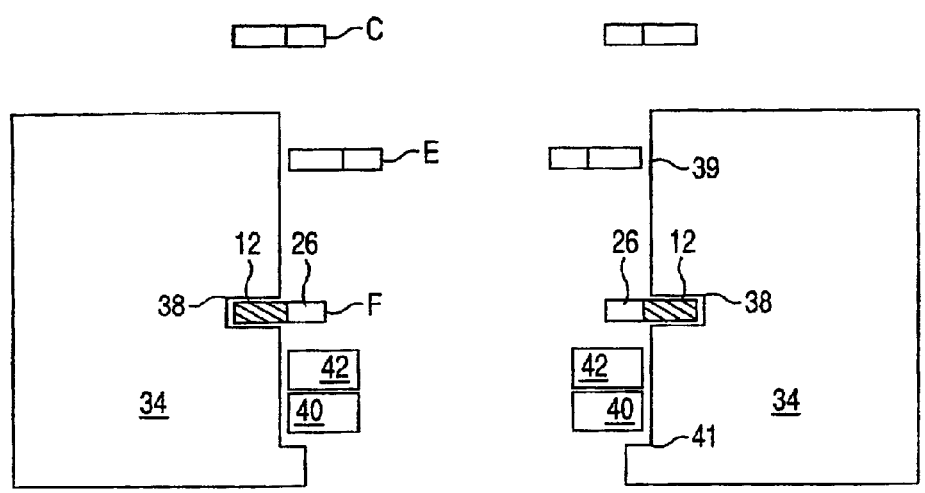
FIG. 5 is partial cross sectional view showing the steps of installation of a retaining ring.

FIG. 5 further illustrates the installation process for installing a retaining ring 10 into an annular groove 38. In FIG. 5, the impeller housing 34 has been removed from the tank assembly and is oriented upside down compared to its removal operating orientation. The impeller housing 34 has a bore 39 extending at least partially therethrough which has a shoulder 41 as illustrated. A first step of assembling the arrangement is the insertion of the bearing sets 40 and 42 from the top through the bore 39 so that they rest on the shoulder 41. Next, the retaining ring is compressed for placement in the bore 39.

FIG. 5 schematically illustrates the ring at its uncompressed original state shown at position C. The retaining ring is next compressed as described above, and illustrated at schematically at position E. In this position, the retaining ring has been compressed so that its outer diameter is less than the diameter of the bore 39 and thus the retaining ring can be moved axially through the bore 39 and positioned so that it is aligned with the groove 38.

Once the compressed ring is aligned with the groove 38, it is expanded back into its original uncompressed position as illustrated at position F. In this position, the retaining ring fingers 26 extend inwardly to trap the bearings 40 and 42 so that the bearings are axially restrained at one end by the shoulder 41 and at the other end by the fingers 26.

Figure 6:
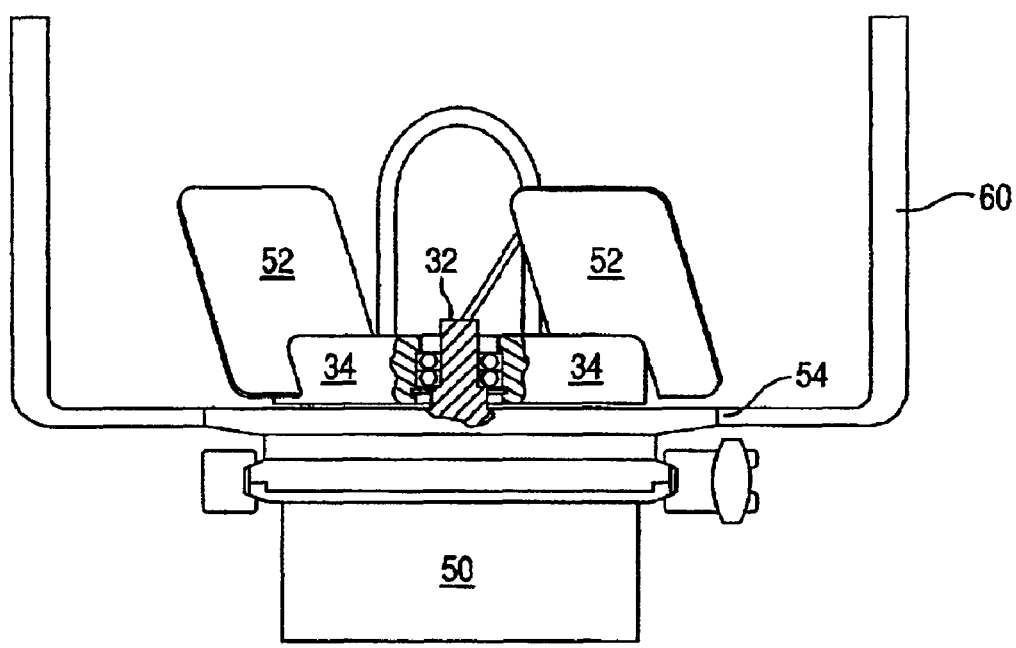
FIG. 6 is a partial cross-sectional view of an impeller assembly installed on the lower inner surface of a mixing vessel.

Once the assembly including the impeller housing 34, bearings 40 and 42, and ring 10 has been assembled as shown in FIG. 5, it is now possible to invert the arrangement of FIG. 5 and lower it onto a stationary shaft 32 as shown in FIG. 6. The stationary shaft 32 has a shoulder 33 as shown so that the bearings are now axially trapped between the shoulder 41 and the shoulder 33. This arrangement provides for the impeller housing to spin around the stationary shaft 32. The impeller housing 34 may have magnetic device that cooperates with a magnetic device associated with a motor 50 which is located below the impeller housing 34.

FIG. 6 illustrates a fully assembled impeller device utilizing the twist ring of the present invention. The rotating impeller housing 34 supports impeller blades 52, and the stationary shaft 32 projects upwardly from a tank plate 54. The tank plate 54 may be located within the enclosure 60 of the vessel. The motor 50 may be located outside the vessel enclosure 60.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A retaining ring movable between an unyielded state and a yielded state, comprising:

a generally C-shaped region having an inner peripheral surface;

an outer peripheral surface;

a first end;

a second end;

a first leg extending from said first end; and a second leg extending from said second end, wherein each of said leas further comprise a respective termination portion, and wherein said termination portion of said first leg further comprises a tool receiving region and said termination portion of said second leg further comprises a tool receiving region, wherein said tool receiving region is one of a slot, a hole and a dimple; and wherein said retaining ring is formed from a yieldable material that has little or no shape memory that yields when moved from the unyielded state to the yielded state.

2. The retaining ring according to claim 1, wherein said C-shaped portion is a curve that is circular in shape.

3. The retaining ring according to claim 1, wherein said ring is constructed from a ductile material.

4. The retaining ring according to claim 3, wherein said ductile material is non-work-hardened stainless steel.

5. The retaining ring according to claim 1, further comprising a first finger projecting from said inner peripheral surface.

6. A retaining ring movable between an unyielded state and a yielded state, comprising:

a generally C-shaped region having an inner peripheral surface;

an outer peripheral surface;

a first end;

a second end; and four fingers projecting from said inner peripheral surfaces, wherein said retaining ring is formed from a yieldable material that has little or no shape memory that yields when moved from the unyielded state to the yielded state.

7. A retaining ring movable between an unyielded state and a yielded state, comprising:
   a generally C-shaped region having an inner peripheral surface;
   an outer peripheral surface;
   a first end;
   a second end;
   a first leg extending from said first end;
   a second leg extending from said second end, wherein said first and second legs are substantially straight and point toward each other in the unyielded state,
   wherein said retaining ring is formed from a yieldable material that has little or no shape memory that yields when moved from the unyielded state to the yielded state.

8. A method for retaining an inner component within an outer component using a retaining ring comprising:
   twisting the retaining ring in first direction using a tool, reducing the diameter of the ring and causing the ring to yield into a yielded state;
   aligning the retaining ring with a groove in the outer component; and
   twisting the retaining ring in second direction opposite to the first direction using the tool, increasing the diameter of the ring and causing the ring to yield into an unyielded state,
   wherein the retaining ring is formed from a yieldable material that has little or no shape memory.

9. The method according to claim 8, wherein the retaining ring is formed from a ductile material.

10. The method according to claim 9, wherein the ductile material is non-work hardened stainless steel.

11. The method according to claim 8, comprising:
   inserting the tool into tool receiving portions of the legs before the first twisting step; and
   removing the tool from tool receiving portions of the legs after the second twisting step.

12. A method for retaining an inner component within an outer housing using a retaining ring comprising:
   moving the ring from a first, unyielded state, to a second, yielded state by rotating a tool engaged with opposed legs of the ring;
   aligning the retaining ring with a groove in the housing; and moving the ring from the second, yielded state into the first, unyielded state by rotating the tool engaged with the legs of the ring,
   wherein the first step of moving the ring from the first state to the second state causes the material of the ring to yield, and wherein the second step of moving the ring from the second state to the first state also causes the material to yield and wherein the retaining ring is formed from a yieldable material that has little or no shape memory.

13. The method according to claim 12, wherein the retaining ring is formed from a ductile material.

14. The method according to claim 13, wherein the ductile material is non work hardened stainless steel.

15. A retaining ring having a diameter, movable between a first, expanded configuration and a second, contracted configuration, comprising:
   a generally C-shaped region having an inner peripheral surface; an outer peripheral surface; a first end; a second end; and said C-shaped region being substantially circularly curved about a center point, wherein said generally C-shaped portion has a first radial width between said inner peripheral surface and said outer peripheral surface;
   a first leg that extends from said first end, having a second width greater than the first width, wherein said first leg comprises a first tool receiving region, said first tool receiving region oriented a first distance from said center point when the ring is in the first, expanded configuration;
   a second leg that extends from said second end, also having said second width, wherein said second leg comprises a second tool receiving region and generally opposes said first tool receiving region, said second tool receiving region oriented also said first distance from said center point when the ring is in the first, expanded configuration; and
   at least two fingers projecting from said inner peripheral surface,
   wherein said generally C-shaped region has little or no shape memory and yields when a first force is applied, deforming the retaining ring from the first configuration, to the second configuration, wherein in the second, contracted configuration said first tool receiving portion translates to be located a distance further from said center point and wherein said second tool receiving portion translates to be located a distance closer to said center point, and
   wherein said generally C-shaped region also yields when a second, opposite force is applied deforming the retaining ring from the second, contracted configuration back to the first, expanded configuration.

* * * * *

UNITED STATES PATENT AND TRADEMARK OFFICE
CERTIFICATE OF CORRECTION

PATENT NO. : 6,843,612 B2
DATED : January 18, 2005
INVENTOR(S) : David Engel

It is certified that error appears in the above-identified patent and that said Letters Patent is hereby corrected as shown below:

<u>Column 6,</u>
Line 34, after "said" replace "leas" with -- legs--.

Signed and Sealed this

Nineteenth Day of April, 2005

JON W. DUDAS
*Director of the United States Patent and Trademark Office*